US011349309B2

(12) United States Patent
Rudez

(10) Patent No.: US 11,349,309 B2
(45) Date of Patent: May 31, 2022

(54) METHOD AND DEVICE FOR IMPROVED UNDER-FREQUENCY LOAD SHEDDING IN ELECTRICAL POWER SYSTEMS

(71) Applicant: UNIVERZA V LJUBLJANI, Ljubljana (SI)

(72) Inventor: Urban Rudez, Postojna (SI)

(73) Assignee: UNIVERZA V LJUBLJANI, Ljubljana (SI)

( * ) Notice: Subject to any disclaimer, the term of this patent is extended or adjusted under 35 U.S.C. 154(b) by 0 days.

(21) Appl. No.: 17/046,068

(22) PCT Filed: Apr. 9, 2018

(86) PCT No.: PCT/EP2018/059048
§ 371 (c)(1),
(2) Date: Oct. 8, 2020

(87) PCT Pub. No.: WO2019/197017
PCT Pub. Date: Oct. 17, 2019

(65) Prior Publication Data
US 2021/0028623 A1 Jan. 28, 2021

(51) Int. Cl.
*H02J 3/14* (2006.01)
*H02H 3/46* (2006.01)
(Continued)

(52) U.S. Cl.
CPC ............... *H02J 3/14* (2013.01); *H02H 3/44* (2013.01); *H02H 3/46* (2013.01); *H02H 7/26* (2013.01);
(Continued)

(58) Field of Classification Search
CPC ....... H02H 3/46; H02H 3/44; H02J 3/14; H02J 13/0006; H02J 2310/12; H02J 13/00004;
(Continued)

(56) References Cited

U.S. PATENT DOCUMENTS

2009/0299540 A1* 12/2009 Abi-Samra ............... H02J 3/14
700/295
2013/0018521 A1 1/2013 Manson

OTHER PUBLICATIONS

Karimi, M., et al. "A new centralized adaptive underfrequency load shedding controller for microgrids based on a distribution state estimator." IEEE Transactions on Power Delivery 32.1 (2016): 370-380. (Year: 2016).*

(Continued)

*Primary Examiner* — Ryan Johnson
(74) *Attorney, Agent, or Firm* — Renner, Otto, Boisselle & Sklar, LLP

(57) ABSTRACT

A method and device for load shedding in an electrical power system is provided. The electrical power system includes a device that electrically couples one or more load feeder lines to the electrical power system, where each load feeder line provides power to consumers. The method includes: monitoring the electrical frequency of the electrical power system and monitoring a frequency stability parameter, which is dependent on a rate of change of the electrical frequency. A control signal is generated to disconnect at least one load feeder line by the device when the monitored frequency is at or below at least a predetermined disconnection frequency threshold and the monitored frequency stability parameter is at or has passed at least one predetermined frequency stability parameter threshold.

12 Claims, 8 Drawing Sheets

(51) Int. Cl.
*H02H 7/26* (2006.01)
*H02H 3/44* (2006.01)
*H02J 13/00* (2006.01)

(52) U.S. Cl.
CPC ..... *H02J 13/00036* (2020.01); *H02J 2310/12* (2020.01); *H02J 2310/60* (2020.01); *Y02B 70/3225* (2013.01); *Y04S 20/222* (2013.01)

(58) Field of Classification Search
CPC ............. H02J 13/00036; H02J 13/0004; H02J 2310/60; Y02B 70/3225; Y04S 20/222; Y04S 10/18
See application file for complete search history.

(56) References Cited

OTHER PUBLICATIONS

Delfino, Bruno, et al. "Implementation and comparison of different under frequency load-shedding schemes." 2001 Power Engineering Society Summer Meeting. Conference Proceedings (Cat. No. 01CH37262). vol. 1. IEEE, 2001. (Year: 2001).*

Shinichi Imai andTadaaki Yasuda, "UFLS program to ensure stable island operation," IEEE PES Power Systems Conference and Exposition, 2004., 2004, pp. 283-288 vol.1, doi: 10.1109/PSCE.2004. 1397430.

"IEEE Guide for the Application of Protective Relays Used for Abnormal Frequency Load Shedding and Restoration," in IEEE Std C37.117-2007 , vol. no., pp. 1-55, Aug. 24, 2007, doi: 10.1109/ IEEESTD.2007.4299516.

International Search Report and Written Opinion for corresponding International Application No. PCT/EP2018/059048 dated Jun. 6, 2018.

Mollah et al., "Marginal Improvement of AUFLS using ROCOF," 2015 Australasian Universities Power Engineering Conference (AUPEC), IEEE, Sep. 27, 2015 (Sep. 27, 2015), pp. 1-6, XP032805198, DOI: 10.1109/AUPEC.2015.7324826.

Bailey et al, IEE Colloquium on Power System Dynamics Stabilisation Coventry, Feb. 23-24, 1998, Session Five: Experience with Power System Oscillations.

Mollah et al., "Automatic Under-Frequency Load Shedding in New Zealand Power System—A Systematic Review", 2011.

International Preliminary Report on Patentability for corresponding International Application No. PCT/EP2018/059048 dated Mar. 18, 2020.

* cited by examiner

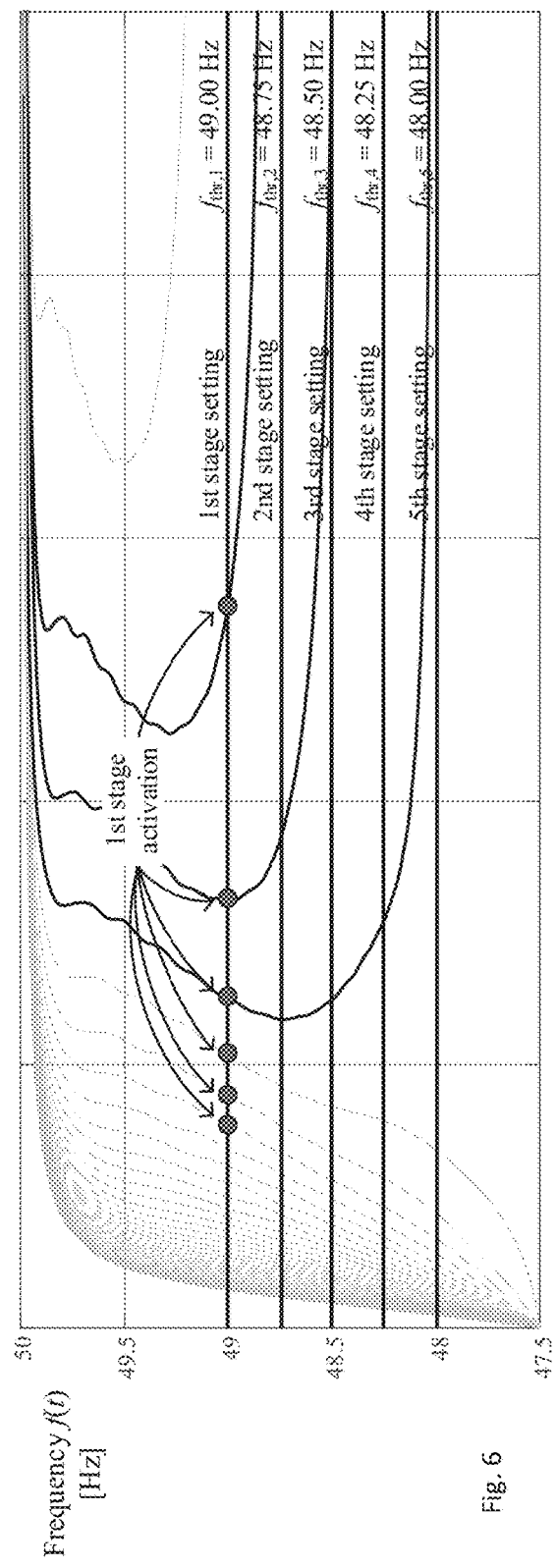
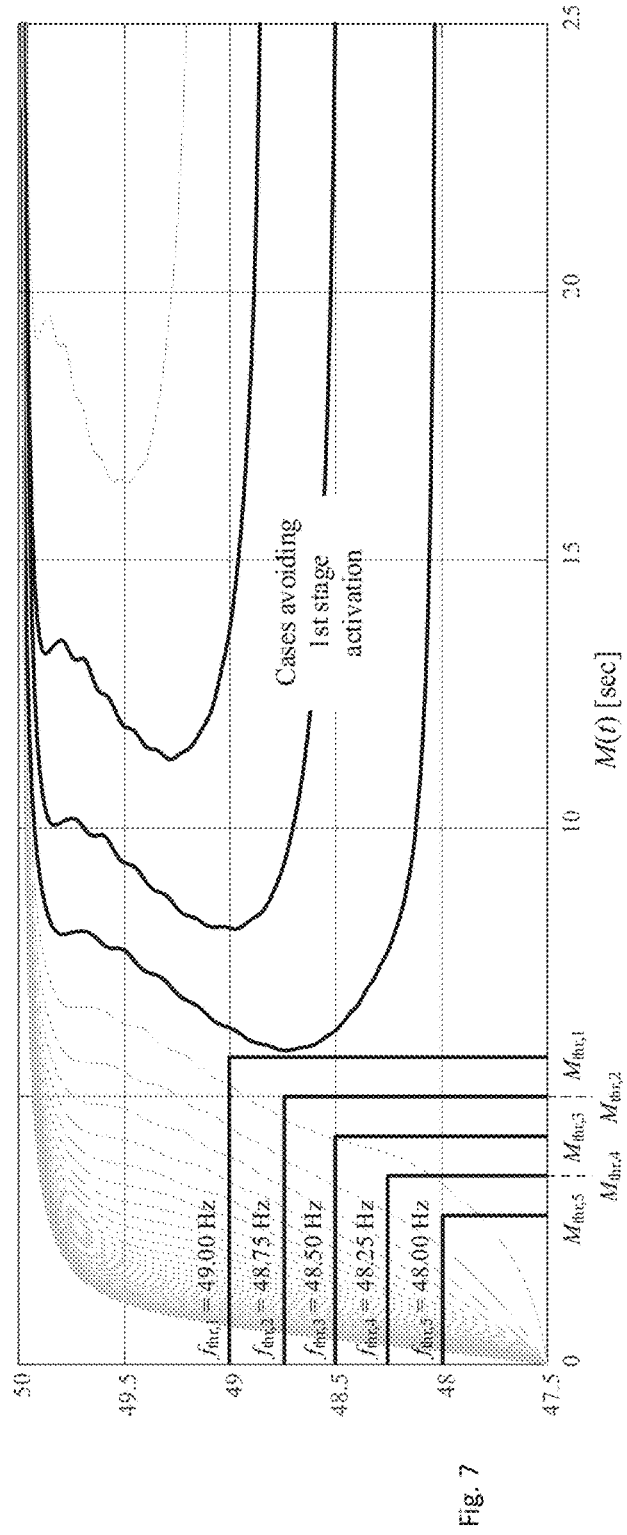
Fig. 6
Fig. 7

METHOD AND DEVICE FOR IMPROVED
UNDER-FREQUENCY LOAD SHEDDING IN
ELECTRICAL POWER SYSTEMS

This application is a national phase of International Application No. PCT/EP2018/059048 filed Apr. 9, 2018 and published in the English language, which is hereby incorporated herein by reference.

TECHNICAL FIELD

The present invention relates to a method and system of shedding load in an electric power system to stabilize the electrical frequency delivered by the electrical power system.

BACKGROUND

Electrical power systems must constantly monitor and maintain a balance between generated power and load to ensure safe and reliable operation. A measure of the active-power balance is the rotating speed of synchronous generators and consequently the frequency of the generated alternating electrical voltage. The frequency is set to a standard nominal value (e.g. 50 Hz in Europe, 60 Hz in the U.S.). A safe operating frequency range is defined according to generators' capability to remain connected to the power system without exposure to damage. For example, when the nominal frequency is 50 Hz, the safe operating range is typically between about 51.5 and 47.5 Hz. Outside this range, each generator will have a frequency level at which it will have to disconnect in order to protect itself. An imbalance between active-power generation and load causes the frequency to deviate from the nominal value. If a large amount of active-power generation is lost suddenly, for example due to the trip of a generation unit, the frequency will drop. If left unchecked, generators will disconnect, leading to a grave system overload in which demand greatly exceeds supply, resulting ultimately in total frequency collapse and prolonged system outage, or blackout.

One manner in which electrical power systems typically mitigate such an imbalance is to selectively disconnect load from the system when frequency falls below the nominal value but before the critical lower frequency of the safe operating range has been reached. This mechanism is commonly referred to as Under Frequency Load Shedding or UFLS. In most conventional systems, pre-determined blocks of load are shed in stages, with each stage being triggered at a specific threshold frequency within the safe operating frequency range. Different systems vary in terms of the number of stages used, the amount of load disconnected per stage, the frequency thresholds and the power of the sum of all stages, i.e. the total possible disconnected load. Load shedding is used in order to restore the active-power balance between generation and load and thus return the frequency to the nominal value.

However, when the disconnected load per stage exceeds the lost generation power, there is a risk of the frequency initially rising excessively to overshoot the upper limit of the safe frequency range causing the disconnection of one or more further generators units. This, in turn, causes the frequency to drop once again, this time faster due to less inertia in the system. The resulting instability may lead to system outage. This risk can be diminished by allowing the load to be shed more gradually, for example, by increasing the number of stages, and thus reducing the amount of load shed per stage. However, increasing the number of stages requires a complete reconfiguration of the UFLS protection scheme, which is complex as it requires widespread modification to the various sub-stations, and is in some cases precluded by utility grid regulations. In addition, increasing the number of stages to be disconnected before the lower limit of the safe frequency range is attained impacts on the response time of the system to a large event, i.e. to an event causing a rapid drop in frequency, as the disconnection of each block of load has an inherent latency due to the operation of relays and circuit breakers. Hence when an event causes a rapid reduction in frequency, it may occur that several load blocks are triggered before the associated loads are actually disconnected with the risk that a disproportionate amount of load is shed, leading to frequency overshoot. The configuration of the UFLS protection system is also potentially more complex, because individual load feeders are often subject to different power flows, depending on the season, day of the week or time of day, for example, whereas a large block of load feeders can be selected to balance out such variations. The problem is still further aggravated by the increasing deployment of converter-based generator units using renewable energy. The volatile character of such generation units means that an electrical power system with a high penetration of such distributed energy sources will be subject to greater variations in power flow.

SUMMARY OF THE INVENTION

An object of the present invention is to provide a method and device for shedding load that is capable of mitigating the effects of a power imbalance in an electrical power system in a more flexible manner than prior art systems. It is a further object to provide a method and device that is able to adapt better to the prevailing power imbalance condition.

The above object is achieved in accordance with the present invention in a method of load shedding in an electrical power system where the electrical power system includes at least one device that electrically couples at least one load feeder line to the electrical power system where the at least load feeder line provides power from said electrical power system to one or more power consumers. The method includes the steps of: monitoring the electrical frequency of the electrical power system; monitoring a frequency stability parameter, the frequency stability parameter being dependent on a rate of change of the electrical frequency of the electrical power system; generating a control signal to disconnect the at least one load feeder line by the at least one device, when the monitored frequency is at or below at least one predetermined disconnection frequency threshold and the monitored frequency stability parameter is at or has passed at least one predetermined frequency stability parameter threshold.

By employing a frequency stability parameter that is dependent on the rate of change of frequency in addition to the criterion of a fixed drop in frequency to the decision on when to shed load, it is possible to postpone or even avoid disconnecting load in some cases, and hence significantly decrease the risk of frequency overshoot. The frequency stability parameter in effect serves as an indication of the severity of a deviation from the nominal frequency. In addition, since the rate of change of frequency is much more oscillatory in character compared to frequency itself, not all protection devices will detect a breach of the frequency stability parameter threshold at the same time. Hence existing stages defined by the frequency thresholds are effectively split into more than one stage allowing a more gradual shedding of load that better mirrors the active-power deficit.

The method is thus particularly suited to electrical power systems that have a high proportion of volatile, converter-based renewable generation sources.

In accordance with a further embodiment of the present invention, the method includes the steps of generating the control signal to disconnect by the at least one device at least one load feeder line when the monitored frequency is at or below a predetermined disconnection frequency threshold ($f_{thr,i}$) and the monitored frequency stability parameter is at or has passed a first predetermined frequency stability parameter threshold ($M_{thr,i1}$), and generating said control signal to disconnect by the at least one device at least one further load feeder line when the monitored frequency is at or below the predetermined disconnection frequency threshold ($f_{thr,i}$) and the monitored frequency stability parameter is at or has passed at least a second predetermined frequency stability parameter threshold ($M_{thr,i2}$). Hence it is possible to actively split existing stages into an arbitrary number of sub-stages, simply by applying more than one frequency stability parameter threshold to each frequency threshold. The response of the system to unplanned power deficit events is thus greatly improved with a considerably lower risk of power outage.

Preferably, the frequency stability parameter represents the time remaining until the monitored frequency falls to a predetermined low frequency limit and thus provides an indication of the margin or tolerance available before additional load should be shed. In this way the selection of a suitable margin for each load shedding stage is facilitated.

In accordance with a preferred embodiment of the invention, the monitoring steps include determining the electrical frequency of the electrical power system at a time t, determining the rate of change of frequency at said time t and determining the frequency stability parameter M(t) from the determined frequency and rate of change of frequency. Hence the decision as to whether to disconnect load from the system can be made based on locally measured and calculated values rather than receiving some or all of these values from another geographically dislocated site (e.g. control center). In any event, the step of determining the frequency stability parameter M(t) can advantageously include applying the following equation $$M(t) = \frac{f_{LIM} - f(t)}{RoCoF(t)}$$

where f(t) is the determined electrical frequency of the electrical power system at time t, RoCoF(t) is the rate of change of said frequency at time t and $f_{LIM}$ is a predetermined lower frequency limit.

In accordance with a further advantageous embodiment of the invention, the method includes receiving values of at least one of the predetermined disconnection frequency threshold, the predetermined frequency stability parameter threshold or the lower frequency limit from a remote controller. By rendering possible the remote adjustment or configuration of the system parameters for load shedding, for example by a utilities provider, the system can be modified to adapt best to the prevailing system configuration and conditions.

Preferably, the step of monitoring the electrical frequency of the electrical power system includes monitoring the frequency of a voltage supplied by said electrical power system.

The above objects are also achieved in a device for electrically coupling and uncoupling at least one predetermined block of load from an electrical power system, the device including a controller configured to monitor the electrical frequency of the electrical power system, to monitor a frequency stability parameter, said frequency stability parameter being dependent on the rate of change of the electrical frequency of the electrical power system, and to generate a control signal to disconnect the at least one block of load from the electrical power system when the monitored frequency is at or below at least one predetermined disconnection frequency threshold value and the determined frequency stability parameter is at or has passed at least one frequency stability parameter threshold value.

The present invention also resides in a computer program product comprising instructions, which, when executed on at least one processor, cause the at least one processor to carry out the above method.

Further objects and advantages are achieved in the appended claims.

BRIEF DESCRIPTION OF THE DRAWINGS

The foregoing will be apparent from the following description of the example embodiments as illustrated in the accompanying drawings. The drawings are not necessarily to scale, emphasis instead being placed upon illustrating the example embodiments.

FIG. 6 is a graph showing the frequency versus frequency stability margin M(t) of the active power deficit conditions shown in FIG. 5, FIG. 7 illustrates load shedding using frequency stability margin M(t) on the graph of FIG. 6.

DETAILED DESCRIPTION

Aspects of the present disclosure will be described more fully hereinafter with reference to the accompanying drawings. It will be appreciated that the apparatus and method disclosed herein can be realized in many different forms and should not be construed as being limited to the aspects set forth herein. The terminology used herein is for the purpose of describing particular aspects of the disclosure only, and is not intended to limit the invention.

Figure 1:
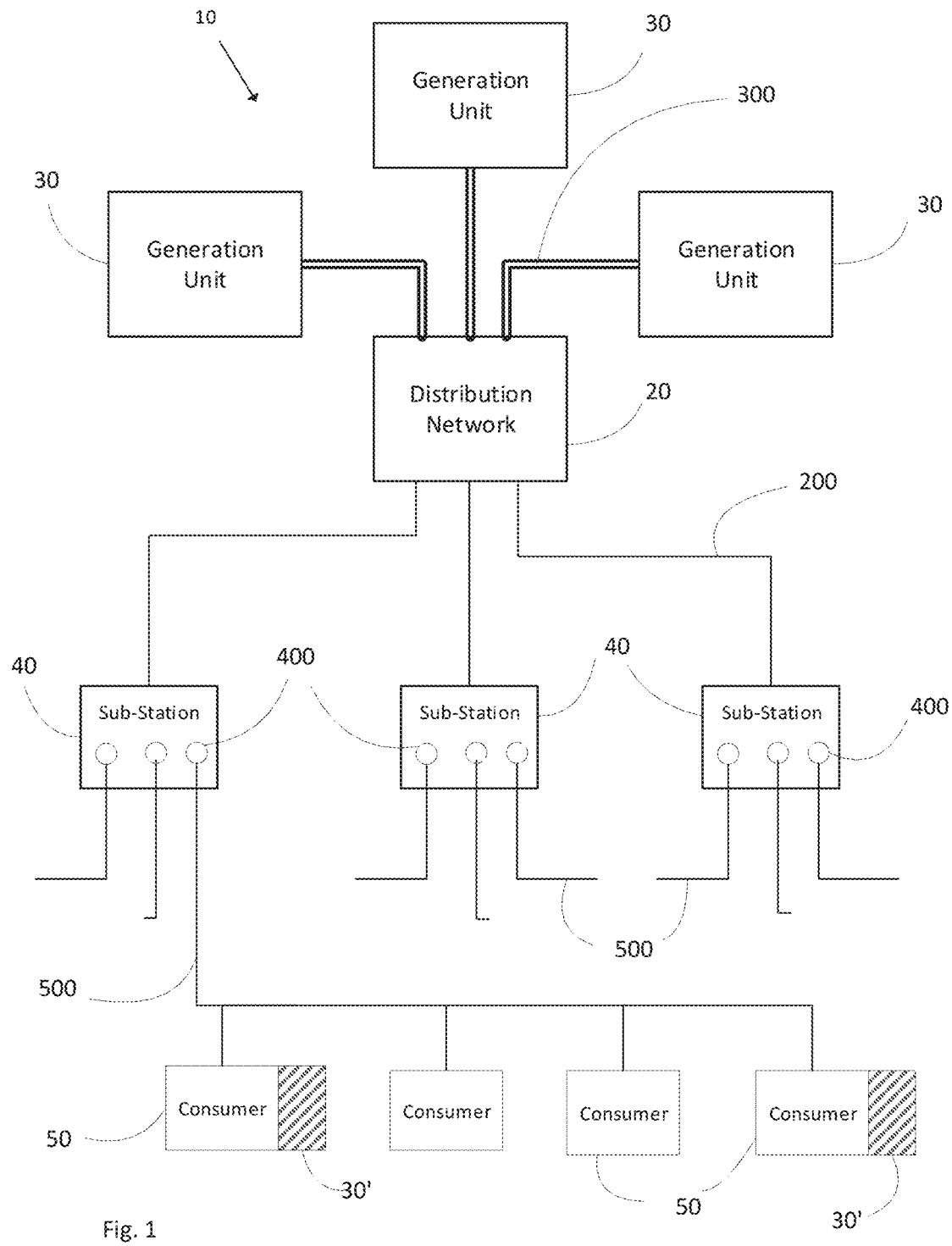
FIG. 1 schematically illustrates an electrical power system.

FIG. 1 schematically shows an example of an electrical power system 10. The system 10 includes a number of generation units 30. These generation units may include conventional power stations, such as gas, nuclear or the like, which typically have high inertia constants, as well as converter-based generation units powered by renewable energy sources, such as solar power plants, wind turbine installations, or the like, which do not exhibit any inertia at all (unless specialized synthetic-inertia control in the converter is assumed). Each generation unit in the illustrated example is connected to a distribution network 20 via transmission lines 300 over which the generated power is fed. The distribution network 20 in turn feeds the power to a plurality of sub-stations 40. Each sub-station provides power to consumers 50 via one or more load feeder lines 500, which are illustrated by dashed lines. Each sub-station 40 further includes a load shedding device 400 for electrically disconnecting or connecting one or more load feeder lines 500 to the electrical power system. The consumers 50 include residences, commercial premises and industrial facilities. Collectively, the consumers 50 are the load of the electrical power system. The consumers 50 may also include dispersed generation units, schematically indicated by shaded areas 30', which can significantly influence the active-power flow at the point of connection of load feeder lines 500.

Figure 2:
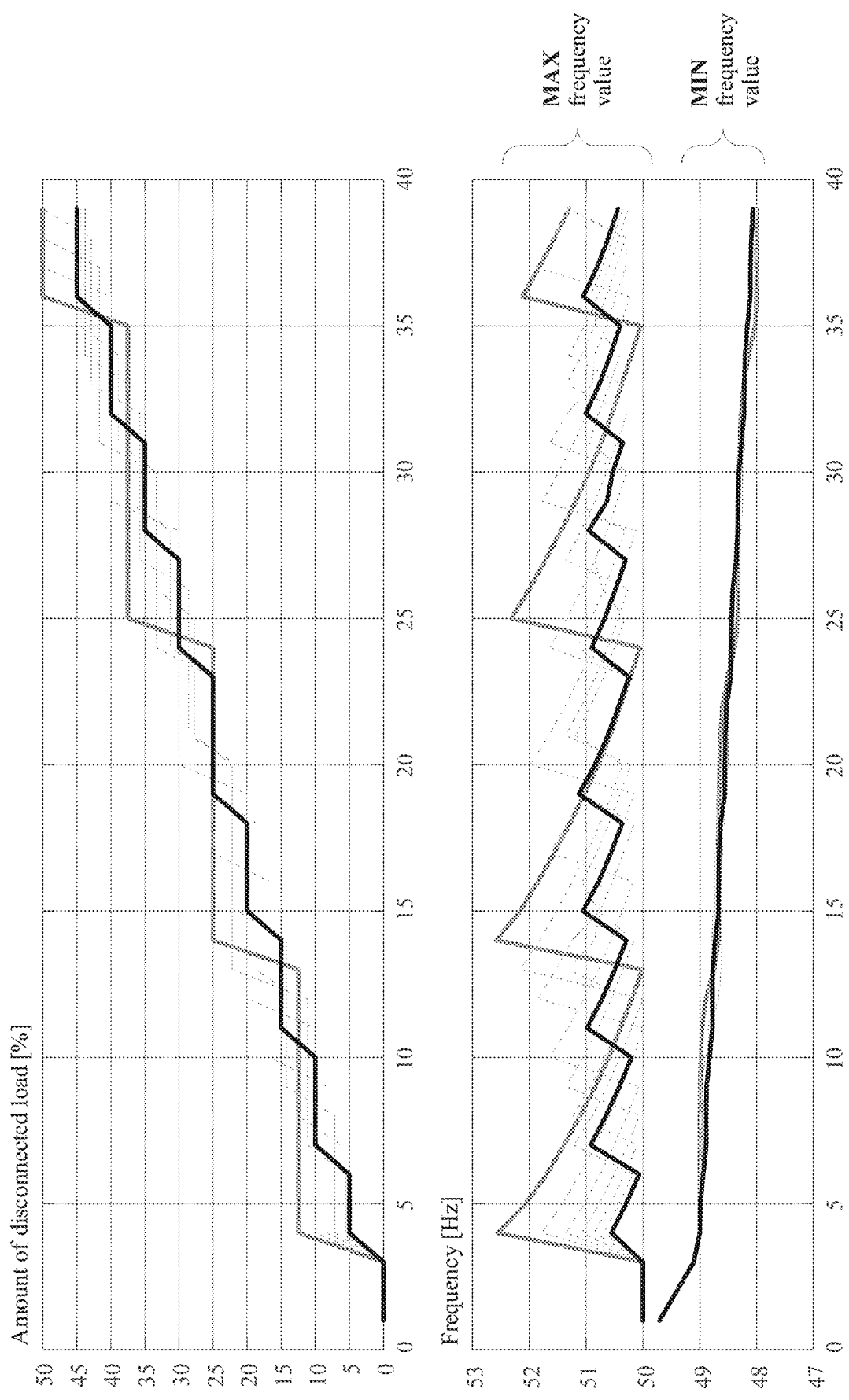
FIG. 2 shows two graphs illustrating the principle of under-frequency load shedding used in conventional systems.

When an event occurs pushing the system into active power deficit (generation deficit) the system frequency falls from the set nominal frequency (typically 50 Hz). In order to restore balance and the nominal frequency, electrical power systems conventionally employ a load shedding scheme in which pre-defined blocks of load are disconnected from the system in stages with each stage being triggered to disconnect at a specific frequency threshold. FIG. 2 shows two graphs that illustrate the impact of different load shedding schemes on the system frequency over time. The upper graph shows the relationship between different amounts of active-power deficit imposed to a power system (horizontal axis) and total amount of disconnected load (vertical axis) when frequency threshold only is treated as a shedding criterion. Different curves represent results with varying numbers of shedding steps (denoted as "n"). The lower graph shows minimum and maximum frequency values obtained during the power-system frequency response for the conditions depicted in the upper graph. In each case, seven separate schemes are depicted. These schemes differ in the number of shedding stages used (4 stages through to 10 stages) and the amount of load disconnected at each stage, however, for each case an equal amount of load (power) is shed per stage and the sum of shed load in all cases is 50%. In both graphs, the dark grey line shows the frequency values for a 4-stage load shedding arrangement, while the black line shows frequency values for a 10-stage arrangement. The remaining schemes are illustrated in light grey. As can be seen in the upper graph of FIG. 2, the disconnected load curves show a step-wise shape with each stage corresponding to the disconnection of the predefined block of load feeders. In the illustrated 4-stage scheme the disconnection of 12.5% of load is triggered each time the frequency falls below 49 Hz, 48.7 Hz, 48.4 Hz and 48 Hz. In the 10-stage scheme 5% of load is disconnected each time the frequency falls 0.1 Hz between 49 Hz and 48 Hz. It is apparent from the lowermost graph that the maximum frequency value jumps upwards as newly triggered block is disconnected. For the 4-stage scheme, illustrated in dark grey, this jump consistently overshoots 52 Hz, which is the upper limit of the safe frequency range. Hence, for the 4-stage scheme there is a risk that generator units will disconnect in response to this overshoot, which would cause the frequency to drop at a greater rate, and ultimately cause a system outage. This problem is not apparent for the 10-stage scheme, shown by the black line, as here the upper frequency does not exceed 51 Hz. However, the re-configuration of stages is a complex and time-consuming procedure. In addition, increasing the number of stages may reduce the ability of the system to respond to large events due to the response time of each shedding stage.

In response to the shortcomings of existing load-shedding schemes, an alternative solution is described below that provides greater flexibility and softer frequency stabilization with minimal reconfiguration of existing UFLS protection systems.

Figure 3:
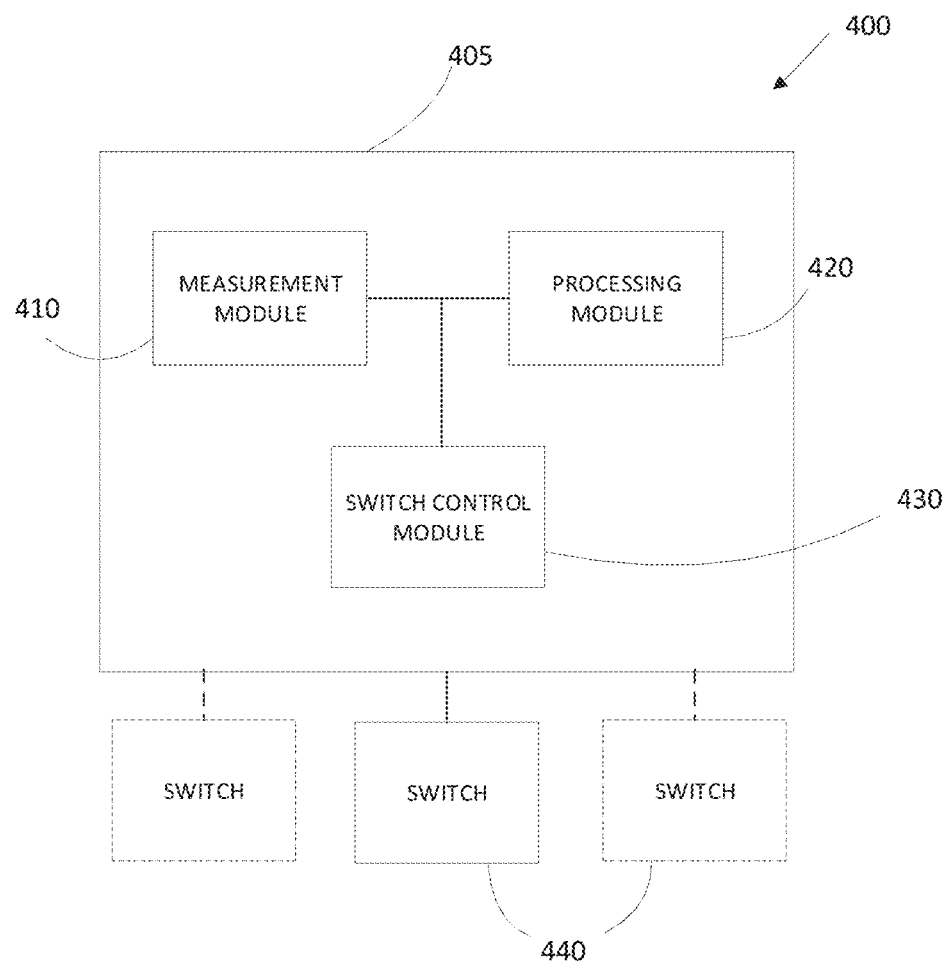
FIG. 3 is a schematic illustration of a device for electrically disconnecting one or more loads from the electrical power generation system according to the present invention.

Turning now to FIG. 3 there is shown a schematic representation of a load shedding device 400 according to an embodiment of the present invention. This device 400 may be implemented as a relay, such as an under-frequency relay, or alternatively control one or more separate relays, which may be arranged locally or at remote locations from the device.

As depicted in FIG. 3, the device 400 includes a controller 405 for controlling one or more switches or relays 440. The controller 405 is represented by three functional modules 410, 420, 430 that are interconnected. These include a measuring module 410 a switch control module 430 and a processing module 420. The switch control module 430 generates signals for controlling one or more switches or relays 440. Each of these switches 440 is selectively electrically coupled or uncoupled to one or more load feeder lines 500 (see FIG. 1).

The measurement module 410 measures the real-time voltage frequency and outputs a value representative of the frequency at that instant in time f(t). This frequency f(t) is understood to be the frequency of the electrical power system. Preferably, module 410 samples the received voltage at a predetermined sampling rate. This measured frequency f(t) is used by the processing module 420 to determine a value representative of the rate of change of frequency at the same instant in time (RoCoF(t)). The rate of change of frequency RoCoF(t) at time t is calculated over a predetermined time window (or predetermined number of samples) that is sufficiently short to enable the device 400 to detect significant changes in frequency while ignoring small oscillations. Based on these measurements, processing module 420 calculates a further parameter, namely, the frequency stability parameter M(t), which will be described in more detail below with reference to FIG. 4. The processing module 420 further compares the frequency stability parameter M(t) value to a preset frequency stability parameter threshold $M_{thr,i}$ and also the measured frequency f(t) with a corresponding frequency threshold value $f_{thr,i}$. Only if the processing module determines that both thresholds are attained or crossed does the switch control module 430 generate a command to control one or more switches 440 to disconnect load feeder lines that are connected thereto, thereby shedding a predetermined quantity of load from the electrical power system.

While the measurement, processing and switch control modules are shown as separate elements in FIG. 3, it will be understood that the corresponding functions may be implemented by a single processor, or group of processors with associated software. It is further conceivable that the function of the measurement module 410 be performed by a separate arrangement and the results communicated to the processing and controller modules 420, 430 of the controller 405 by wired or wireless connection.

The device may incorporate a single switch or relay 440, as shown in solid line in FIG. 3, and be used as a protection device for a single block of load. In this case, the device 400 may be implemented as a conventional processor-controlled under-frequency load shedding relay that is modified to determine and apply the additional load shedding criteria of frequency stability margin M(t). When configured in this manner, the device will operate to shed all local load when the frequency threshold and associated frequency stability margin threshold are breached. The device 400 may alternatively be configured to control several relays, i.e. the switch 440 illustrated in solid line in FIG. 3 and additional switches 440 indicated in dashed lines. In this case the switch or switches may be located in a separate arrangement and may even be at a remote location. The connection between the controller 405 and the one or more switches 440 may be via a wired or wireless connection. In this latter situation, the device 400 will be capable of monitoring several frequency thresholds $f_{thr,i}$ and will apply corresponding thresholds for the frequency stability parameter $M_{thr,i}$ for each stage. The switches 440 that disconnect load feeder lines 500 are then grouped into stages, with each stage being disconnected when corresponding frequency and frequency stability parameter thresholds are reached.

More generally, the device 400 acts to disconnect one or more load feeder lines by comparing conditions of the electrical power system with values of load shedding parameters. As discussed above, the device 400 obtains a value of the instantaneous frequency, f(t) of the received electrical voltage and also the rate of change of frequency RoCoF(t) of the received voltage. The device 400 then compares both the instantaneous frequency and a further parameter, namely the frequency stability parameter M(t) with threshold values for each load shedding stage. The frequency stability parameter M(t) provides information on the severity of the active-power deficit. In its simplest form, the frequency stability parameter M(t) can be represented by the rate of change of frequency RoCoF(t). When paired with conventional frequency thresholds for load shedding and taking into account a lower frequency limit $f_{LIM}$ below which the frequency should not be allowed to fall, it is possible to determine whether the load shedding can be delayed. More specifically, when the rate of change of frequency is high, it may be determined that insufficient time remains to delay load shedding before the frequency reaches the lower limit $f_{LIM}$, in which case the frequency threshold will trigger load shedding. In contrast, a lower rate of change of frequency, even at a lower frequency threshold, may indicate that some margin remains until the lower frequency limit $f_{LIM}$ is reached, and thus load shedding can be delayed or even completely avoid if the rate of change of frequency falls thereafter.

It is considered preferable at least on a conceptual level, however, when the frequency stability parameter represents the time margin remaining until the frequency falls from a current measured value to the lower frequency limit $f_{LIM}$. The frequency stability parameter M(t) is thus preferably expressed as follows:

$$M(t) = \frac{f_{LIM} - f(t)}{RoCoF(t)}$$

In the above equation, the lower frequency limit $f_{LIM}$ may be chosen arbitrarily for any system, but generally represents the minimum allowable frequency in a power system.

Figure 4:
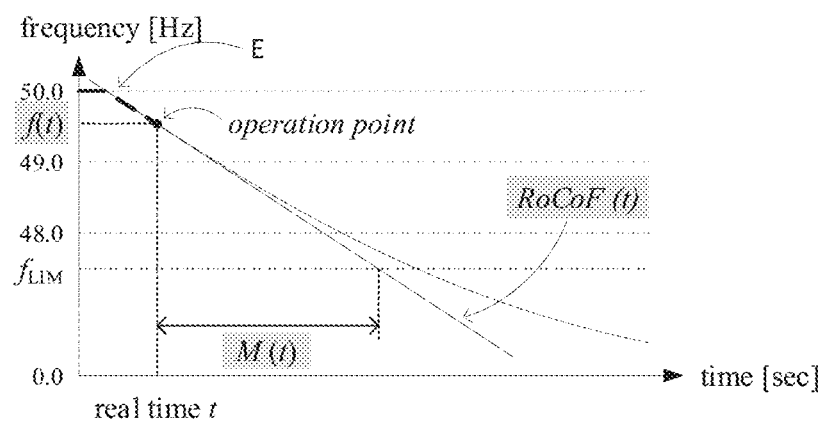
FIG. 4 is a graph illustrating the frequency stability margin M(t) in accordance with an embodiment of the present invention.

This is illustrated more clearly in FIG. 4, which shows a graph of frequency vs. time and illustrates an event of generation deficit which causes the electrical frequency to drop from the nominal value of 50 Hz. In this scenario, the lower frequency limit $f_{LIM}$ is set to 47.5 Hz. In this case, this is the lowest tolerable operating frequency; below this frequency, generator units 30 will start to disconnect from the electrical power system 10. The illustrated frequency curve is initially at the nominal value of 50 Hz, but starts to drop following an event, shown at E, at which active-power balance is disturbed. At the operation point the frequency f(t) is measured by device 400 and the frequency stability parameter M(t) calculated. As can be seen from FIG. 4, the frequency stability parameter M(t) is an estimate of the time remaining before the frequency reaches the lower frequency limit $f_{LIM}$ assuming that it continues to fall at the same rate. The actual frequency drop is shown as the dashed line. The parameter M(t) thus represents the margin available before the system becomes unstable, assuming the active-power deficit remains unchecked.

Figure 5:
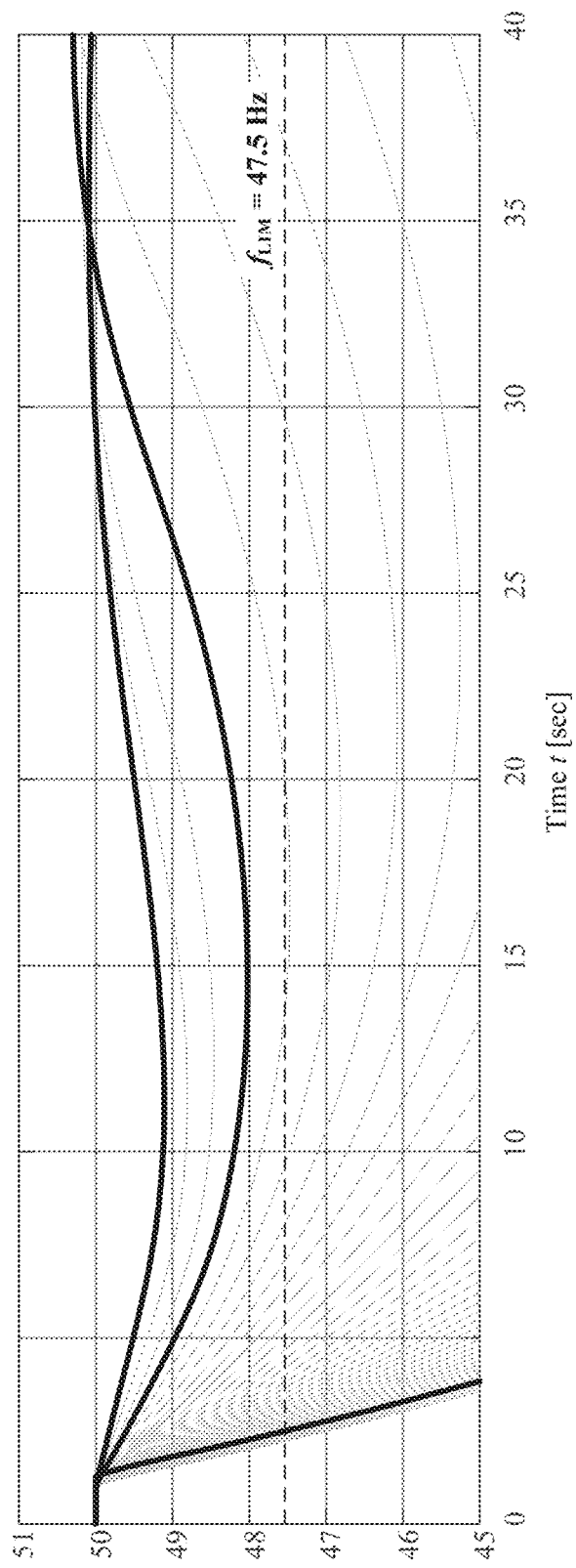
FIG. 5 is a graph showing the power-system frequency response over time for several active-power deficit conditions, without UFLS operation

The impact on the frequency of an electrical power system of applying both a frequency threshold $f_{thr,i}$ and a frequency stability parameter threshold $M_{thr,i}$ to each stage of load to be shed is shown graphically in FIGS. 5 to 7.

The graph of FIG. 5 depicts frequency-versus-time curves corresponding to different active-power deficit conditions without load shedding. FIG. 6 shows a graph of frequency f(t) against frequency stability parameter M(t) for the same active-power deficit conditions of FIG. 5. It is clear that for those curves which fall below $f_{LIM}$ in FIG. 5 the corresponding curves in FIG. 6 converge towards the origin. In contrast, for the remaining cases when the frequency falls yet remains within the safe operating range, i.e. above $f_{LIM}$, in FIG. 5, the corresponding trajectories in FIG. 6 are sooner or later re-directed towards the right-hand side of the diagram. Those cases have corresponding larger values of M(t), which indicates a small rate of change of frequency (RoCoF(t)). For those cases, shedding load is unnecessary as the frequency stays above $f_{LIM}$ and the system is ultimately able to restore balance. In the remaining cases on the other hand, shedding is a necessity.

On the graph of FIG. 6 there are illustrated frequency thresholds ($f_{thr,i}$-$f_{thr,5}$) for a 5-stage load shedding scheme as is commonly employed in conventional UFLS systems. It is apparent from FIG. 6 that in all cases but one the first shedding stage is activated at frequency $f(t)=f_{thr,1}$. This is clearly unnecessary for three of the depicted cases, as examination of FIG. 5 reveals that the frequency is ultimately stabilized without load shedding. By avoiding unnecessary load shedding consumers are protected from even a temporary loss of power, and the risk of unnecessary frequency overshoot is also precluded.

FIG. 7 illustrates the effect of applying the additional load shedding condition in the form of the frequency stability parameter $M_{thr,i}$ in each shedding stage. By applying this additional condition, for those cases having large values of M(t) (which predicts the violation of fum in the future), activation of individual shedding stages is blocked despite the corresponding frequency threshold being violated. However, activation of the stage under question can still occur later at lower frequency when on top of $f_{thr,i}$ the newly-introduced criterion $M_{thr,i}$ is violated as well. As can be seen from FIG. 7, each frequency threshold $f_{thr,1}$ has an associated frequency stability margin value $M_{thr,i}$, with both the frequency threshold and frequency stability parameter threshold decreasing for each subsequent stage.

It is noted that when the additional criterion of frequency stability parameter M(t) is applied in different under-frequency relays, or devices 400 that are set to shed load at the same nominal frequency threshold and with the same parameter threshold, $M_{thr}$, some devices will trip the load, and others may not depending on the measured value of the rate of change of frequency (RoCoF(t)). The reason for this is that RoCoF(t) is more oscillatory in nature than frequency, and thus different relays may detect different values depending on the sampling instant, and hence trigger the shedding of load for the same stage at different times. Hence, the introduction of this additional criterion in effect seemingly increases the number of stages without the need for system reconfiguration.

Figure 8:
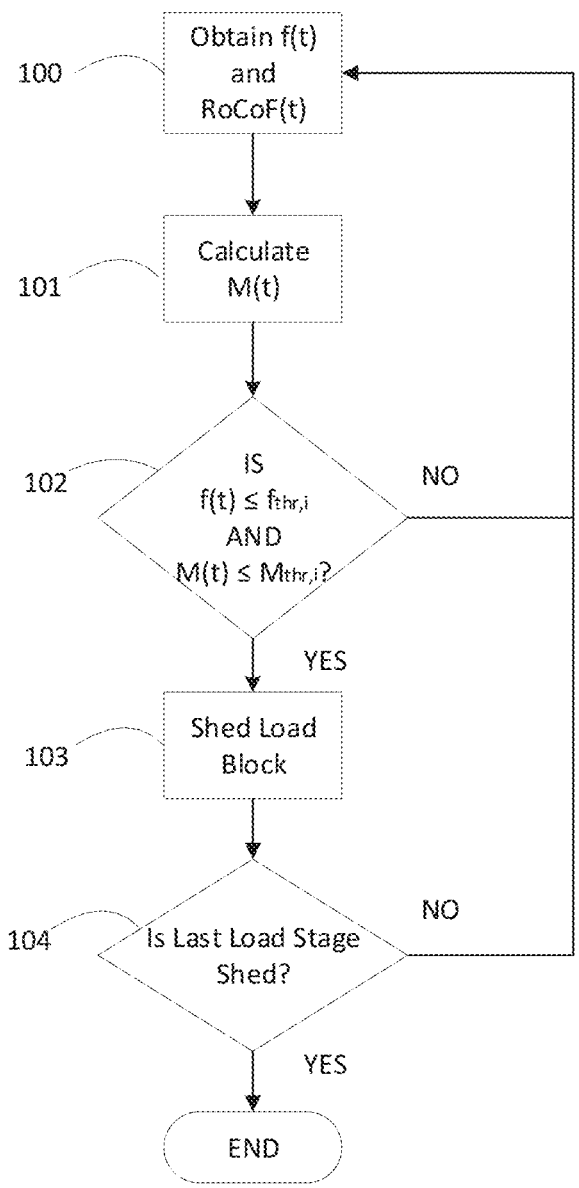
FIG. 8 is a flow diagram illustrating a method of load shedding according to the present invention.

Turning now to FIG. 8 there is illustrated a method of load shedding in accordance with the present invention. This method may be performed in the device 400. The method starts at step 100 with the acquisition of the instantaneous frequency f(t) and rate of change of frequency RoCoF(t). These values are either attained through measurement or from another device that performs the measurement. At step 101, the frequency stability parameter M(t) is calculated using the measured values and a fixed lower frequency limit $f_{LIM}$ that is preset for the system. At step 102, the frequency f(t) is compared with the frequency threshold value $f_{thr,i}$ for the load shedding stage in question and the frequency stability parameter calculated in step 102 is compared with the frequency stability threshold value $M_{thr,i}$ corresponding to the same stage. If one of the conditions of step 102 is not met, the method returns to step 100. Only if both the frequency threshold and the frequency stability parameter threshold are reached or crossed does the method then move from step 102 to step 103 where the predefined load is shed corresponding to the load stage. When the method is carried out in a single under-frequency relay that is operative for a single load shedding stage this step will involve all the local load being shed and the method terminates. Otherwise, at step 104, if it is ascertained that further load shedding stages exist, the method returns to step 100. When all loads are shed, the method terminates. It is noted here that this method applies equally if the frequency stability parameter is represented by the rate of change of frequency RoCoF(t), however in this case the corresponding thresholds are maximum values, which must be equaled or exceeded to trigger the load shedding.

The various thresholds for frequency ($f_{thr,i}$) and frequency stability parameter ($M_{thr,i}$) as well as the lower frequency limit $f_{LIM}$ may be pre-configured in each device 400. Alternatively, these parameter settings may be adjustable, either locally or via a communication link with the electric power system provider. It is noted that the adjustment of the lower frequency limit $f_{LIM}$ will necessarily affect the frequency stability parameter $M_{thr,I}$ with a lower limit allowing larger margins and hence enabling greater improvements when using the frequency stability parameter for load shedding. The improvement is reduced when the lower frequency limit is raised $f_{LIM}$, for example from 47.5 Hz to 48 Hz, as an unavoidable consequence of narrowing the available manoeuvre space for frequency excursion.

The frequency stability parameter thresholds are preferably set to reflect the frequency response of an electrical power system. One of most influential parameters on this frequency response is the average inertia constant H. For systems having a high average inertia constant, the optimal frequency stability parameter will be higher than for systems having a lower average inertia. However, as a low average inertia H represents the worst case situation with respect to rate of change of frequency RoCoF, it is preferable to tune the frequency stability threshold $M_{thr,1}$ to this kind of system. In this way, unnecessary disconnections are avoided for both low-as well as large-inertia systems, which makes it especially attractive for electrical power systems with a high penetration of converter-based generation units. A preferred range for the frequency stability parameter for a first load shedding stage ($M_{thr,1}$) is 4-6 seconds, and most preferably 4 seconds. The frequency stability parameter for a second load shedding stage ($M_{thr,2}$) is preferably of the order of 2.5 seconds.

It is noted that the application of a frequency stability parameter to the triggering of load shedding has most impact in postponing or preventing the triggering of load shedding when the rate of change of frequency is low. The frequency stability parameter does not significantly alter the activation of load shedding when the rate of change of frequency (RoCoF) is high i.e. when a large active power deficit occurs suddenly. However, the use of the frequency stability parameter does alter the timing of subsequent load shedding stages, i.e. when the decline in frequency has been arrested by the initially shed load and hence is advantageous for reducing the unnecessary shedding of load.

As discussed above, use of the frequency stability parameter as an additional criterion to frequency for triggering the shedding of load can have the effect of increasing the number of load shedding stages when different relays operate to shed load at the same stage, but detect different rates of change of frequency. However, the frequency stability parameter may also be used to introduce additional intermediate load shedding stages in a system. The number of frequency stages that may be applied in a system is often defined in utility grid regulations, however, there is no limitation on the use of the rate of change of frequency. Hence it is possible to satisfy these regulations in terms of the frequency steps used yet introducing new stages by applying several values of $M_{thr}$ to each frequency threshold $f_{thr}$.

Figure 9:
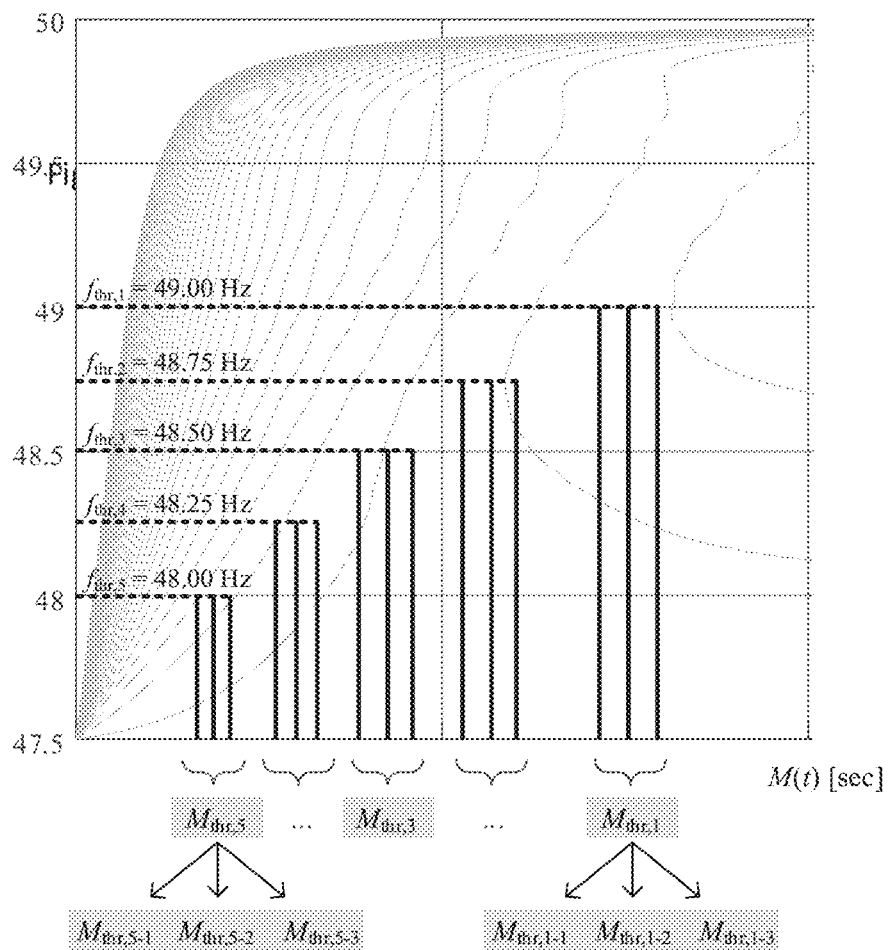
FIG. 9 shows a graph illustrating a modification of the use of frequency stability margin as a criterion for load shedding.
Figure 10:
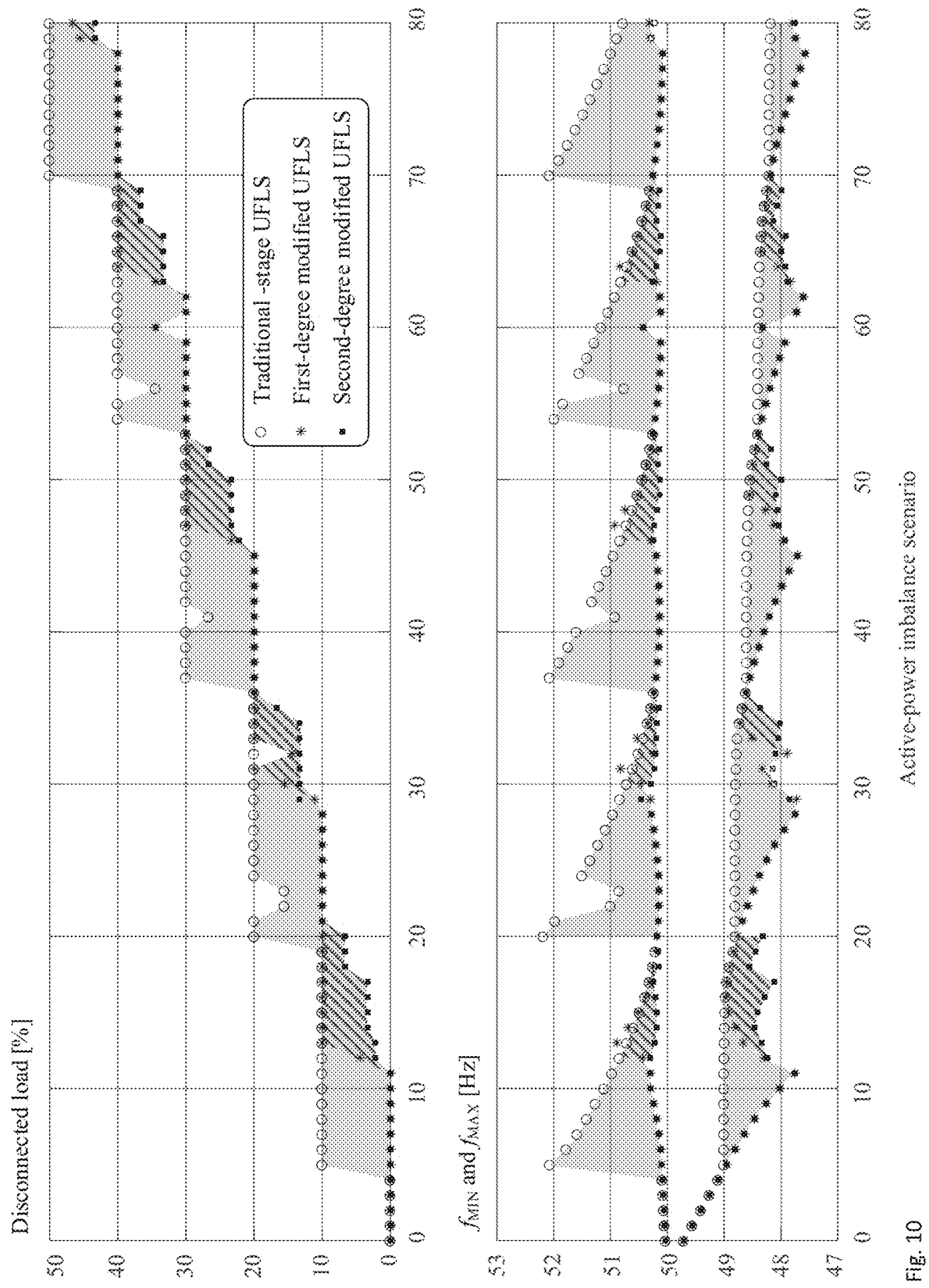
FIG. 10 shows graphs illustrating the improvement between a conventional UFLS scheme and the modified UFLS schemes.

FIG. 9 shows a graph of frequency against frequency stability parameter M(t) for a system in which each frequency stage i is assigned three values of frequency stability parameter $M_{thr,i}$ being denoted as $M_{thr,i-1}$, $M_{thr,i-2}$ and $M_{thr,i-3}$. In situations with high rate of change of frequency, RoCoF, this will not play any role in UFLS operation. On the other hand, once the rate of change of frequency is successfully decreased by the initial shedding of load, the segmentation of existing stages serves to fine-tune the process of load disconnection. This is illustrated in FIG. 10, which shows the percentage of disconnected load and maximum and minimum frequency for different UFLS settings for an electrical power system with an average inertia constant H of 6 seconds. In the graphs, the characteristics of a conventional UFLS scheme in which load is shed at fixed frequency thresholds (traditional-stage UFLS), is shown with open circles, while a UFLS scheme incorporating the second criteria of one frequency stability parameter threshold per stage (first-degree modified UFLS) is illustrated with stars, and the UFLS scheme shown in FIG. 9 (second-degree modified UFLS) is shown with dark squares. The grey-shaded area illustrates the improvement with respect to a conventional UFLS scheme triggered by frequency alone, while the cross-hatched areas show the additional improvement over the first-level modification using a single frequency stability parameter per load shedding stage.

It is evident that the second-degree modification reflects in practically no frequency overshoot (frequency always maintained below 50.5 Hz). In addition the scheme shows an increased level of adaptability as the disconnected load is practically linearly dependent on the active-power imbalance. In this way, efficiency level of several theoretical wide-area UFLS schemes is achieved without the need for communication between protection devices.

The invention claimed is:

1. A method of load shedding in an electrical power system, the electrical power system including at least one device that electrically couples at least one load feeder line to the electrical power system, the at least one load feeder line providing power from said electrical power system to one or more power users, the method including the steps of: monitoring an electrical frequency of the electrical power system, monitoring a frequency stability parameter, said frequency stability parameter being dependent on a rate of change of the electrical frequency of the electrical power system and representing time remaining until the electrical frequency falls from a measured value to a predetermined low frequency limit, generating a control signal to disconnect, by said at least one device, said at least one load feeder line when the monitored frequency is at or below at least one predetermined disconnection frequency threshold and said monitored frequency stability parameter is at or has passed at least one predetermined frequency stability parameter threshold.

2. A method as claimed in claim 1, further including the steps of:
generating said control signal to disconnect by said at least one device at least one load feeder line when the monitored frequency is at or below a predetermined disconnection frequency threshold ($f_{thr,i}$) and said monitored frequency stability parameter is at or has passed a first predetermined frequency stability parameter threshold ($M_{thr,i1}$), and generating said control signal to disconnect by said at least one device at least one further load feeder line when the monitored frequency is at or below said predetermined disconnection frequency threshold ($f_{thr,i}$) and said monitored frequency stability parameter is at or has passed at least a second predetermined frequency stability parameter threshold ($M_{thr,i2}$).

3. A method as claimed in claim 1, wherein said monitoring steps include determining the electrical frequency of the electrical power system at a time t, determining the rate of change of frequency at said time t and determining the frequency stability parameter M(t) from said determined frequency and rate of change of frequency.

4. A method as claimed in claim 1, wherein said step of determining the frequency stability parameter M(t) includes applying the following equation $$M(t) = \frac{f_{LIM} - f(t)}{RoCoF(t)}$$

where f(t) is the determined electrical frequency of said electrical power system at time t, RoCoF(t) is the rate of change of said frequency at time t and $f_{LIM}$ is a predetermined lower frequency limit.

5. A method as claimed in claim 1, further including receiving values of at least one of said predetermined disconnection frequency threshold and said predetermined frequency stability parameter threshold and said lower frequency limit from a remote controller.

6. A method as claimed in claim 1, wherein said step of monitoring the electrical frequency of the electrical power system includes monitoring the frequency of a voltage supplied by said electrical power system.

7. A device for electrically coupling and uncoupling at least one predetermined block of load from an electrical power system, the device including a controller configured:
to monitor an electrical frequency of the electrical power system,
to monitor a frequency stability parameter, said frequency stability parameter being dependent on a rate of change of the electrical frequency of the electrical power system and representing time remaining until the electrical frequency falls from a measured value to a predetermined low frequency limit, and
to generate a control signal to disconnect said at least one block of load from said electrical power system when said monitored frequency is at or below at least one predetermined disconnection frequency threshold value and said determined frequency stability parameter is at or has passed at least one frequency stability parameter threshold value.

8. A device as claimed in claim 7, wherein said controller is configured to generate a control signal to disconnect at least one load feeder line when the monitored frequency is at or below a predetermined disconnection frequency threshold ($f_{thr,i}$) and said monitored frequency stability parameter is at or has passed a first predetermined frequency stability parameter threshold ($M_{thr,i1}$), and generating a control signal to disconnect at least one further load feeder line when the monitored frequency is at or below said predetermined disconnection frequency threshold ($f_{thr,i}$) and said monitored frequency stability parameter is at or has passed at least a second predetermined frequency stability parameter threshold ($M_{thr,i2}$).

9. A device as claimed in claim 7, wherein said controller is further configured to determine the frequency of the electrical power system at a time t, to determine the rate of change of frequency at said time t and to determine the frequency stability parameter M(t) from said determined frequency and rate of change of frequency.

10. A device as claimed in claim 7, wherein said controller is further configured to determining the frequency stability parameter M(t) by applying the following equation $$M(t) = \frac{f_{LIM} - f(t)}{RoCoF(t)}$$

where f(t) is the determined frequency of said electrical power system at time t, RoCoF(t) is the rate of change of said frequency at time t and $f_{LIM}$ is a predetermined lower frequency limit.

11. A device as claimed in claim 7, wherein said controller is further configured to receive values of at least one of said predetermined disconnection frequency threshold and said predetermined frequency stability parameter threshold and said lower frequency limit from a remote controller.

12. A device as claimed in any claim 7, wherein said controller is further configured to monitor the frequency of the electrical power system by determining the frequency of a voltage supplied by said electrical power system.

* * * * *